United States Patent
Soddemann et al.

(10) Patent No.: US 9,249,236 B2
(45) Date of Patent: Feb. 2, 2016

(54) PROCESS FOR THE PRODUCTION OF WATER AND SOLVENT-FREE HYDROGENATED NITRILE RUBBERS

(71) Applicant: LANXESS Deutschland GmbH, Leverkusen (DE)

(72) Inventors: Matthias Soddemann, Schattdorf (CH); Werner Obrecht, Moers (DE); Franz-Josef Mersmann, Bergisch-Gladbach (DE); Hanns-Ingolf Paul, Leverkusen (DE); Paul Wagner, Dusseldorf (DE); Rolf Feller, Mettmann (DE); Thomas Koenig, Leverkusen (DE); Jorg Kirchhoff, Leverkusen (DE); John Lovegrove, Sarnia (CA)

(73) Assignees: LANXESS Deutschland GmbH, Cologne (DE); LANXESS International SA, Granges-Paccot (CH)

(*) Notice: Subject to any disclaimer, the term of this patent is extended or adjusted under 35 U.S.C. 154(b) by 68 days.

(21) Appl. No.: 13/874,930

(22) Filed: May 1, 2013

(65) Prior Publication Data

US 2014/0024784 A1    Jan. 23, 2014

Related U.S. Application Data

(63) Continuation of application No. 13/635,946, filed as application No. PCT/EP2011/054285 on Mar. 22, 2011, now abandoned.

(30) Foreign Application Priority Data

Mar. 25, 2010 (EP) .................................. 10157846

(51) Int. Cl.
*C08L 9/02* (2006.01)
*C08C 2/00* (2006.01)
(Continued)

(52) U.S. Cl.
CPC ...... *C08C 2/02* (2013.01); *C08C 1/12* (2013.01); *C08C 2/00* (2013.01); *C08C 19/02* (2013.01); *C08F 6/003* (2013.01); *C08L 15/005* (2013.01); *C08F 236/12* (2013.01)

(58) Field of Classification Search
CPC ............ C08C 19/02; C08C 2/00; C08C 2/02; C08F 236/12; B29C 47/76; B29C 47/767; C08L 9/02
See application file for complete search history.

(56) References Cited

U.S. PATENT DOCUMENTS 2,995,829 A * 8/1961 Allen .............................. 34/203
3,117,953 A    1/1964 Goebel
(Continued)

FOREIGN PATENT DOCUMENTS

EP    1127609 A2    8/2001
JP    2001146503 A    5/2001

OTHER PUBLICATIONS

Lanxess (Lanxess expands Therban AT product portfolio; Dramatic reduction in the viscosity of HNBR rubbers. Sep. 11, 2009, 5 pages).*
(Continued)

*Primary Examiner* — Brieann R Fink
(74) *Attorney, Agent, or Firm* — Cary E. Ruffner

(57) ABSTRACT

The present invention relates to a process for the production of water and solvent-free hydrogenated nitrile rubber polymers, to the hydrogenated nitrile rubbers and the use thereof.

27 Claims, 4 Drawing Sheets

(51) Int. Cl.
    *C08C 1/12*      (2006.01)
    *C08F 236/12*    (2006.01)
    *C08C 2/02*      (2006.01)
    *C08C 19/02*     (2006.01)
    *C08F 6/00*      (2006.01)
    *C08L 15/00*     (2006.01)

(56) References Cited

U.S. PATENT DOCUMENTS

| | | | |
|---|---|---|---|
| 4,198,265 A * | 4/1980 | Johnson | 159/47.1 |
| 4,686,279 A | 8/1987 | Nagtzaam et al. | |
| 4,906,329 A * | 3/1990 | Tominari et al. | 159/47.1 |
| 4,909,898 A | 3/1990 | Padliya et al. | |
| 5,241,013 A | 8/1993 | Rempel et al. | |
| 5,283,021 A | 2/1994 | Shih | |
| 5,684,087 A | 11/1997 | Wulff et al. | |
| 6,811,294 B1 | 11/2004 | Elsner et al. | |
| 7,737,193 B2 | 6/2010 | Reif et al. | |
| 7,745,539 B2 | 6/2010 | Guerin et al. | |
| 7,919,563 B2 | 4/2011 | Guerin et al. | |
| 7,951,439 B2 | 5/2011 | Gong et al. | |
| 7,951,875 B2 | 5/2011 | Guerin et al. | |
| 2001/0056176 A1 | 12/2001 | Takami et al. | |
| 2004/0236029 A1 * | 11/2004 | Guerin et al. | 525/329.3 |
| 2007/0049700 A1 | 3/2007 | Obrecht et al. | |
| 2007/0287806 A1 | 12/2007 | Ong et al. | |
| 2009/0233097 A1 * | 9/2009 | Kolich et al. | 428/402 |
| 2010/0216961 A1 | 8/2010 | Reif et al. | |
| 2012/0041126 A1 | 2/2012 | Nasreddine et al. | |

OTHER PUBLICATIONS

Therban AT 3443 VP (Trial Product) Preliminary Product Data Sheet. Lanxess, Jan. 1, 2010, 2 pages.*
C.G. Hagberg, Process Machinery—"Comparison of solution rubber finishing processes—Part 1", Mar. 2000, pp. 17-19, 23.
C.G. Hagberg, Process Machinery—"Comparison of solution rubber finishing processes—Part II", Apr. 2000, pp. 28-30.
International Search Report from co-pending Application PCT/EP2011/054285 dated May 10, 2011, 3 pages.
Taiwan Patent Office (TIPO) Search Report dated Jan. 14, 2015, for co-pending Taiwan Patent Application 100110019, one page.

* cited by examiner

PROCESS FOR THE PRODUCTION OF WATER AND SOLVENT-FREE HYDROGENATED NITRILE RUBBERS

This application is a continuation of U.S. patent application Ser. No. 13/635,946 filed Sep. 19, 2012, with the same title, which claims the right of priority under 35 U.S.C. §119 (a)-(d) and 35 U.S.C. §365 of International Application No. PCT/EP2011/054285 filed Mar. 22, 2011 which is entitled to the right of priority of European Patent Application No. 10157846.6 filed Mar. 25, 2010, the contents of which are hereby incorporated by reference in their entirety.

The present invention relates to water and solvent-free hydrogenated nitrile rubbers, a process for the production thereof and the use thereof.

Copolymerization of $\alpha,\beta$-unsaturated nitriles with conjugated dienes and optionally one or more further copolymerizable termonomers leads to so-called nitrile rubbers (also referred to as "NBR" for short). Said copolymerization is typically carried out by an emulsion process, which firstly gives an NBR latex which is then coagulated to isolate the NBR solid using mostly salts or acids as coagulants. Only recently a new method of producing NBR via RAFT Technology (Reversible Addition-Fragmentation Technology") in organic solvents has been developed this being subject of an earlier patent application by applicant not yet published.

Hydrogenated nitrile rubber, also referred to as "HNBR" for short, is produced by a subsequent hydrogenation of NBR. Accordingly, the C=C double bonds of the copolymerized diene units are completely or partly hydrogenated in HNBR. The degree of hydrogenation of the copolymerized diene units is usually in the range from 50 to 100%. Hydrogenated nitrile rubber is a speciality rubber which has very good heat resistance, excellent resistance to ozone and chemicals and also an excellent oil resistance. In addition HNBR also possesses very good mechanical properties, in particular a high abrasion resistance. HNBR has found wide use in a broad variety of applications and is used e.g. for seals, hoses, belts and damping elements in the automobile sector, also for stators, well seals and valve seals in the field of oil production and also for numerous parts in the aircraft industry, the electrical industry, machine construction and shipbuilding.

Most commercially available HNBR grades usually have a Mooney viscosity (ML 1+4 at 100V) in the range from 55 to 120, which corresponds to a number average molecular weight Mn (determination method: gel permeation chromatography (GPC) against polystyrene standards) in the range from about 100 000 to 500 000. The polydispersity index PDI (PDI=Mw/Mn, where Mw is the weight average molecular weight and Mn is the number average molecular weight), which indicates the width of the molecular weight distribution, measured here frequently has a value of 3 or well above. The residual double bond content is usually in the range from 0 to 18% (determined by NMR or IR spectroscopy). However, the term "fully hydrogenated grades" is used in the technical field when the residual double bond content is not more than about 0.9%.

The processability of HNBR grades having the abovementioned Mooney viscosities of up to 120 is subject to limitations. For many applications, it is desirable to have HNBR grades which have a lower molecular weight and a lower Mooney viscosity, since this significantly improves the processability. However, the preparation of HNBR having low molar masses and Mooney viscosities (ML 1+4 at 100° C.) in the range of up to about 55, has for a long time not been possible by means of established production processes mainly for two reasons: Firstly, a substantial increase in the Mooney viscosity (so-called Mooney Increase Ratio, "MIR") occurs during hydrogenation of NBR to HNBR. This MIR is around about 2 or above, depending on the polymer grade, hydrogenation level and nature of the NBR feedstock and increases in particular with decreasing Mooney viscosity of the NBR feedstock. Secondly, the molar mass of the NBR feedstock used for the hydrogenation cannot be reduced at will since otherwise processing in the available industrial plants is no longer possible because of excessive high stickiness. The lowest Mooney viscosity of a NBR feedstock which can be processed without difficulties in an established industrial plant is in the range of about 25 Mooney units (ML 1+4 at 100° C.). This lower limit will increase with increasing ACN content of the NBR since the stickiness will rise with the ACN content. The Mooney viscosity of the HNBR obtained therefrom is in the order of 55 and more Mooney units (ML 1+4 at 100° C.). The Mooney viscosity is determined in accordance with ASTM Standard D 1646.

Many attempts have already been made to shorten the polymer chain length of HNBR by degradation, e.g. by thermomechanical treatment (mastication), e.g. on a roll mill or also in a screw apparatus (EP A-0 419 952). However, this thermomechanical degradation has the disadvantage that functional groups such as hydroxyl, keto, carboxylic acid and ester groups are built into the molecule as a result of partial oxidation and, in addition, the microstructure of the polymer is substantially altered.

In recent years, this problem has been solved by reducing the molecular weight of the NBR by degradation thereby obtaining Mooney viscosities (ML 1+4 at 100° C.) of less than 30 Mooney units or a number average molecular weight Mn of <70.000 g/mol before hydrogenation. Such decrease in the molecular weight is achieved by cross-metathesis in which low molecular weight 1-olefins may be added. The metathesis of NBR is described e.g. in WO-A-02/100905, WO-A-02/100941 and WO-A-03/002613 and uses specific metathesis catalysts tolerant to polar groups, in particular the nitrile groups. It is typically carried out in a suitable organic solvent which does not deactivate the catalyst used and also does not adversely affect the reaction in any other way. Preferred solvents include but are not restricted to dichloromethane, chloroform, 1,2-dichloroethane, 1,1,2-trichloroethane, monochlorobenzene, dichlorobenzene, trichlorobenzene, benzene, toluene, xylene, methyl ethyl ketone, ethyl acetate, acetone, tetrahydrofuran, tetrahydropyran and dioxane. One preferred solvent is monochlorobenzene. Preferably the metathesis is carried out in the same solvent as the subsequent hydrogenation reaction so that the degraded nitrile rubber does not have to be isolated from the solvent after the degradation reaction is complete before it is subjected to the subsequent hydrogenation. The hydrogenation can be carried out using homogeneous or heterogeneous hydrogenation catalysts. The catalysts used are typically based on rhodium or ruthenium, but it is also possible to use platinum, iridium, palladium, osmium, cobalt or copper either as metal or preferably in the form of metal compounds. Preferred catalysts are homogeneous catalysts like e.g. tris (triphenylphosphine)rhodium(I) chloride, tris(triphenylphosphine)rhodium(III)chloride and tris(dimethylsulphoxide)rhodium(III) chloride and also tetrakis (triphenylphosphine)rhodium hydride of the formula $(C_6H_5)_3 P)_4RhH$ and the corresponding catalysts in which all or part of the triphenylphosphine has been replaced by tricyclohexylphosphine. Additionally it is also possible to use the well-known Grubbs type metal complex catalysts (e.g. Grubbs I and Grubbs II catalyst) which are otherwise typically used for metathesis reactions, but also show hydrogenation activity.

After hydrogenation the catalyst and/or the metal included in the catalyst may be removed from the HNBR solution. In case of a heterogenous catalyst not dissolved in the reaction medium, the catalyst may be readily removed by filtration or centrifugation. In case of a homogeneous catalyst ion exchange resins which are mostly functionalized by various groups can be used to remove catalysts and catalyst residues.

The HNBR is then typically isolated from the reaction solution by (A1) coagulation wherein the HNBR solution is brought into direct contact with steam ("steam stripping"), or (A2) a drum drying method wherein the HNBR solution is dropped onto a heated rotating drum to evaporate the solvent, or (A3) a method wherein a poor solvent is added to the HNBR solution to precipitate the HNBR.

However, all aforementioned processes for coagulation suffer from very high energy consumption.

Using method (A1) a large amount of steam is necessary not only to evaporate the solvent but also to heat and maintain the complete water content of the stripping drums at a high temperature. Additional steam addition is also necessary to strip off residual amounts of solvent by lowering the partial pressure of the solvent in the stripping drum.

Using method (A3) the energy consumption results from the efforts to separate the two solvents by distillation, the latter also requiring specific equipment protected against explosion.

Method (A1) also utilizes a large amount of water because the concentration of the HNBR in the slurry after coagulation is generally only 1.5 to 12% by weight. All water from this slurry constitutes waste water and must be disposed of lateron.

Further disadvantages of the stripping method (A1) result from (occasionally) sticky crumbs and the ill controllable size of the rubber crumbs: If the rubber crumbs are sticky the rubber crumbs cannot be completely removed from the stripping unit and reduced polymer yields are observed. If the rubber crumbs formed are very big stripping efficiency is reduced. Also without so far known reason a build-up of the HNBR Mooney viscosity can occur during the stripping process. This is valid in particular for hydrogenated nitrile rubber with high acrylonitrile contents since the stickiness increases with increasing acrylonitrile content.

A disadvantage of the drum drying method (A2) is the formation of impurities by overdried material (gel).

In case of method (A1) the HNBR rubber crumbs are often separated from the bulk water mechanically using simple sieve trays or screens. The disadvantage of this drying process is the contamination of water by small rubber particles that are not held back by the sieves with the result that the waste water requires additional treatment. The hydrogenated nitrile rubber still contains approximately 30 to 100% water based on the weight of the HNBR after this first separation. Mechanical drying is then conducted using extruders by kneading the product and squeezing out the water. The removal of the water takes place via vent ports along the extruder housing. A die plate may be installed at the outlet of the extruder and the hydrogenated nitrile rubber may be cutted in small pieces after passing the die plate. After this mechanical drying the HNBR still contains approximately 3-10% water based on the weight of the HNBR after this first separation. Further drying is therefore typically conducted by either using (B1) an extruder or (B2) a convective dryer. In method (B1) the HNBR is heated to 150 to 200° C. under pressure e.g. in a single screw or twin screw extruder, and water is removed by kneading and squeezing the HNBR. A die plate may be installed at the outlet of the extruder to maintain the pressure and when the HNBR is pushed through the die plate, the water in the rubber evaporates and forms open porous strings. A cutting device then cuts the strings into small pieces. In method (B2) the HNBR crumbs are conveyed to a convective dryer where residual moisture is removed by hot air. After such drying according to (B1) or (B2), the HNBR generally has a moisture content of 0.1 to 0.7%. Optionally a cooling stage, accomplished by flowing cold air through the rubber pieces, can be applied to cool the hydrogenated nitrile rubber crumbs down to preferred baling temperature of 60° C. The rubber pieces are then formed into bales by hydraulic presses, and the bales are packed into boxes or crates for shipment.

In case the poor solvent method (A3) is used the solvents need to be removed by distillitation. The HNBR thereafter obtained is additionally subjected to a drying procedure as e.g. hot-air drying or vacuum drying.

Summing up, all aforementioned process for isolating and drying hydrogenated nitrite rubbers are complex and require extensive equipment. Furthermore, the process parameters must be carefully monitored to avoid heat and shear stress, which would accelerate degradation of the hydrogenated nitrile rubber.

Various other special processes have been developed with the aim of removing water and volatile organic solvents from other type of polymers. Extruder degassing in vacuum with or without the use of entrainers has gained acceptance in practical applications as the most important technique, however, the energy requirements of such prior art processes are quite high.

U.S. Pat. No. 3,117,953 A1 discloses an apparatus and process for purifying high pressure polyethylene. DE 195 37 113 discloses a method and an apparatus for polymer resins in particular polycarbonate resins using a steam stripper a decanter and an extruder. However, the introduction of steam again results in an undesireable high content of residual water or a very high energy consumption. EP 0 102 122 discloses a method for polymer recovery from a solution, in particular for recovery of polyethylene, using a partially filled extruder. However, EP 0 102 122 is silent about the removal of residual water. US 2001/056176 A1 discloses a one step method of recovering a polymer and specifically an example for the concentration of rubber solutions. The rubber solution is thereby heated with steam in order to remove existing solvents in one step by degassing under vacuum to produce white crumb. US 2001/056176 A1 thereby requires a large volumetric vapor flow to remove the volatile components at low vapor pressure and results in the enclosure of additional water in the crumbs, which water would subsequently need to be removed. U.S. Pat. No. 5,283,021 A1 discloses a two step process for removing solvent from an elastomeric polymer solution. The polymer solution is thereby heated directly by a heating fluid and sprayed under vacuum. During the spraying, the solvent is evaporated, thereby forming crumbs which are then fed to an extruder for further degassing. However, crumb formation at that stage is not desirable. EP 1 127 609 A2 discloses a process to treat a product in at least one kneader. Such process uses energy introduced in part through the wall of the kneader itself to evaporate the solvent from solutions containing elastomers and thermoplastics. A kneader with a large surface area is therefore required as are high investment costs. Another portion of the energy is introduced via the rotating shaft of the kneader as mechanical energy. Mechanical energy is more expensive and therefore environmentally disadvantageous when compared to steam heating. Such kneaders require a great deal of maintenance and cleaning.

The introduction of mechanical energy via the kneader is furthermore strongly dependent on the viscosity of the product, which reduces the flexibility of the process. EP 1 165 302 A1 discloses a device and method for degassing plastics. The apparatus used is an extruder with a rear vent and several vent sections operated under vacuum. The vacuum is needed to achieve low residual volatile concentrations. A stripping agent can be applied to further improve degassing efficiency. The plastic used in EP 1 165 302 A1, the thermoplastic polycarbonate, remains a flowing melt at the end of the degassing process. A synthetic rubber cement processed pursuant to EP 1 165 302 A1 would, however, convert to crumbs at the end of the degassing stage and could not be processed further. In "Process Machinery", Parts I and II, March and April 2000; Author: C. G. Hagberg, a direct volatilization of rubber solutions using a flash tank and an extruder is disclosed. However, this reference is silent about the contents of volatile compounds in the final product.

With specific regard to hydrogenated nitrile rubber it turned out that the lower the molecular weight and the Mooney viscosity and the higher the acrylonitrile content of the HNBR gets, the less applicable are any of the known isolation techniques due to the extreme stickiness of the HNBR which results in lost product as outlined above and lengthy finishing times. Additionally the conventional isolation techniques do not necessarily allow for a broad variety of HNBR to sufficiently remove the residual solvent from the polymer, i.e. to a low residual solvent level of below 2000 ppm, preferred below 1000 ppm and especially preferred below 500 ppm. Such low level, however, is extremely important for a variety of reasons. In particular the solvents are harmful to health and the environment and at higher concentrations, degrade the polymer's performance.

In an European patent application by applicant not yet published very low molecular weight HNBR is isolated from the solvent solution by contacting it with a mechanical degassing device which is preferably a single-, twin- or multi-screw extruder, more preferably a twin screw extruder and most preferably a co-rotating, self wiping twin screw extruder. Own investigations, however, have shown that such process still leaves room for optimization.

It was therefore the object of the present invention to provide an energy efficient, ecologically and economically favourable process to remove volatile compounds from a fluid containing at least hydrogenated nitrile rubber thereby producing a hydrogenated nitrile rubber product that is substantially free of volatile compounds. Such process should be preferably operable continuously. This object is solved by a process for producing hydrogenated nitrile rubber being substantially free of volatile compounds comprising removing volatile compounds from a fluid (F) containing
  (i) at least one hydrogenated nitrile rubber comprising repeating units derived from at least one conjugated diene, at least one α,β-unsaturated nitrile and optionally one or more copolymerizable monomers and having a viscosity of at maximum 20,000 Pa*s measured at 100° C. and a shear rate of 1/s, preferably at maximum 10,000 Pa*s, more preferably at maximum 5,000 Pa*s and most preferably at maximum 1,000 Pa*s and
  (ii) at least one volatile compound
  which process comprises at least the steps of:
  a) treating the fluid (F) in at least one concentrator unit comprising at least a heater, a degassing vessel (4) and a vapor line, whereby the fluid (F) is heated, the heated fluid (G) is fed into a degassing vessel where part of the volatile compounds are removed via the vapor line to obtain a concentrated fluid (H),
  b) reheating the concentrated fluid (H) from step a) in at least one reheating unit to obtain a reheated concentrated fluid (L); and
  c) feeding the reheated concentrated fluid (L) from step b) into at least one extruder unit comprising at least an extruder degassing section comprising at least a conveying section, a vent port with one or more vapor lines, an accumulating section and an outlet section, wherein at least one stripping agent is additionally fed to the extruder unit and wherein volatile compounds are removed through the vent ports and vapor lines;
whereby the reheated concentrated fluid (L) is free-flowing upon entering the extruder degassing section and the hydrogenated nitrile rubber obtained at the outlet section is substantially free of volatile compounds.

It is pointed out that the scope of the invention also encompasses any desired combinations of the ranges and areas of preference specified for each feature.

In the context of this invention the term "Product (P)" as far as mentioned shall mean the hydrogenated nitrile rubber after having been subjected to the process according to this invention.

In the context of this invention, the term "free-flowing" means a viscosity in the range of 100 to 50.000.000 mPa*s, preferably 500 to 10.000.000 mPa*s, more preferably 5.000 to 30.000.000 mPa*s and most preferably 10.000 mPa*s to 300.000 mPa*s.

As far as not mentioned otherwise the viscosity values of fluids refer to the zero shear viscosity extrapolated from measurements at given temperature using a Haake Rheostress RS 150 viscosimeter or a rotational rheometer of cone-plate type for very viscous samples.

The extrapolation to zero shear viscosity is typically carried out as follows: Shear stress is measured at given temperature vs. shear rate. A $2^{nd}$ order polynomial is then fitted to the data points obtained from the measurement. The linear portion of such $2^{nd}$ order polynomial reflects the slope at a shear rate of zero and thus is the zero shear viscosity as used in the context of this invention.

The viscosity of the hydrogenated nitrite rubber is also measured using a Haake Rheostress RS 150 viscosimeter or comparable equipment like e.g. a Physica MCR Rheometer (Anton Paar, Germany) at a temperature of 100° C. and at a shear rate of 1/s.

In the context of this invention, the term "substantially free of volatile compounds" means a total concentration of volatile compounds of less than 1.25 wt %, preferably less than 0.75 wt %, more preferably less than 0.5 wt %, more preferably less than 0.2 wt % based on the mass of the hydrogenated nitrile rubber.

The term "substantially free of volatile compounds" means substantially free of water and substantially free of volatile organic compounds.

Hydrogenated nitrile rubbers are considered to be substantially free of water, if the residual water concentration is less than 0.5 wt % preferably less than 0.25 wt %, more preferably less than 0.1 wt % and most preferably less than 0.075 wt %, based on the mass of the hydrogenated nitrile rubber.

In the context of this invention, the term "volatile organic compounds" means organic compounds having a boiling point of below 250° C. at standard pressure.

Hydrogenated nitrile rubbers are considered substantially free of volatile organic compounds, if the residual concentration of said volatile organic compounds is less than 0.75 wt % preferably less than 0.5 wt %, more preferably less than 0.25 wt % and most preferably less than 0.1 wt % based on the mass of the hydrogenated nitrile rubber. Said volatile organic compounds typically comprise the organic solvents employed in the hydrogenation of the NBR to HNBR or any preceding cross-metathesis reaction and include e.g. the hydrogenation solvents selected from the group consisting of dichloromethane, chloroform, 1,2-dichloroethane, 1,1,2-trichlorethane, monochlorobenzene, dichlorobenzene, trichlorobenzene, benzene, toluene, xylene, methyl ethyl ketone, ethyl acetate, acetone, tetrahydrofuran, tetrahydropyran, dioxane, and dimethylacetamide. The volatile organic compounds may further include low molecular weight alkanes, in particular n-hexane, which are formed by hydrogenation of remaining small amounts of the olefines preferably added as "co-olefines" in the metatheses reaction. Preferably the content of the volatile organic compounds, in particular the organic solvents in the HNBR after being subjected to the present process is below 2000 ppm (this being 0.2 wt. % based on the mass of the hydrogenated nitrile rubber), preferably below 1000 ppm (this being 0.1 wt % based on the mass of the hydrogenated nitrile rubber) and more preferably below 500 ppm (this being 0.05 wt % based on the mass of the hydrogenated nitrile rubber)

The way of determining the volatile compounds is well known to any artisan, e.g. measuring the weight difference of a hydrogenated nitrile rubber sample before and after a drying step. The volatile compounds encompassing water and volatile organic compounds except for the higher boiling organic solvents by drying 5 g of the hydrogenated nitrile rubber sample in an aluminum bowl via IR radiation at 105° C. up to a constant weight. Equipment which may be used for such measurement is commercially available, e.g. IR scale HR73 of Mettler. The amount of the volatile compounds encompassing water and volatile organic compounds except for the higher boiling organic solvents is then obtained as weight difference before and after the IR radiation drying.

The amount of higher boiling organic solvents not determined by the aforementioned IR radiation drying may be determined by gas chromatography. A viable procedure is hereinafter described for the determination of monochlorobenzene as preferred solvent of the NBR hydrogenation: 2.5 g of an HNBR sample are cutted to the size of grains of maize and are weighed with an accuracy of +/−1 mg in a 100 ml sealable vessel and thereafter dissolved at room temperature under agitation in 25 ml acetone (duration typically 2-3 hours). A small defined amount of 1,2-dichlorobenzene dissolved in 2 ml acetone is then added as internal standard. The HNBR is then coagulated by adding 40 ml methanol. Thereafter the vessel is filled with methanol up to 100 ml. The amount of monochlorobenzene is then determined by gas chromatography using a Hewlett Packard chromatograph HP 5890 II with a silica capillary column (HP 1 from Hewlett Packard (now Agilent)) and a flame ionisation detector. The capillary column is characterised by the following features: length: 25 m, diameter: 0.32 mm; coating: polydimethylsiloxane, coating thickness: 1.05 μm. For measurement purposes 5 ml of the aforementioned solution from which the coagulated HNBR has been removed is injected into the gas chromatograph at a temperature of 270° C. Hydrogen is used as carrier gas at a flow rate of 2 ml/min. The temperature of the column has a starting temperature of 60° C. and is raised with 10° C./min to 110° C. and thereafter with 25° C./min to 310° C. The column is then kept at a temperature of 310° C. for 8 minutes. Applying the aforementioned conditions results in retention times for monochlorobenzene and 1,2-dichlorobenzene of 2,364 and 5,294 minutes. To quantitatively determine the monochlorobenzene the area ratios of defined monochlorobenzene and 1,2-dichlorobenzene amounts are determined in independent measurements.

The hydrogenated nitrile rubbers obtained by the process according to the invention distinguish over any hydrogenated nitrile rubbers known and commercially available so far in that the concentration of volatile compounds is that low. The process of the present invention is clearly superior to the processes known so far for isolating hydrogenated nitrile rubbers, in particular those of a lower viscosity, as it results in improved yields while the processes of the prior art result in remarkable product losses.

Hydrogenated Nitrile Rubber Subjected to the Process According to the Invention:

The process according to the present invention uses hydrogenated nitrile rubbers as starting rubbers comprising repeating units derived from at least one conjugated diene, at least one α,β-unsaturated nitrile and, if desired, one or more further copolymerizable monomers, i.e. either copolymers or terpolymers having a viscosity of at maximum 20.000 Pa*s (measured at 100° C. and a shear rate of 1/s), preferably at maximum 10.000 Pa*s, more preferably at maximum 5.000 Pa*s and most preferably at maximum 1.000 Pa*s.

The term "derived from" shall mean that in case of the repeating units of the conjugated diene the carbon-carbon double bonds are partially or completely hydrogenated. The hydrogenated nitrile rubbers are obtained by hydrogenating the corresponding nitrile rubbers.

The conjugated diene can be of any nature. Preference is given to using ($C_4$-$C_6$) conjugated dienes. Particular preference is given to 1,3-butadiene, isoprene, 2,3-dimethylbutadiene, piperylene or mixtures thereof. Very particular preference is given to 1,3-butadiene and isoprene or mixtures thereof. Especial preference is given to 1,3-butadiene.

As α,β-unsaturated nitrile, it is possible to use any known α,β-unsaturated nitrile, preferably a ($C_3$-$C_5$) α,μ-unsaturated nitrile such as acrylonitrile, methacrylonitrile, ethacrylonitrile or mixtures thereof. Particular preference is given to acrylonitrile.

A particularly preferred hydrogenated nitrile rubber is thus a copolymer having repeating units derived from acrylonitrile and 1,3-butadiene.

Apart from the conjugated diene and the α,β-unsaturated nitrile, the hydrogenated nitrile rubber may comprise repeating units of one or more further copolymerizable monomers known in the art, e.g. α,β-unsaturated (preferably mono-unsaturated) monocarboxylic acids, their esters and amides, α,β-unsaturated (preferably mono-unsaturated) dicarboxylic acids, their mono-oder diesters, as well as the respective anhydrides or amides of said α,β-unsaturated dicarboxylic acids.

As α,β-unsaturated monocarboxylic acids acrylic acid and methacrylic acid are preferably used.

Esters of α,β-unsaturated monocarboxylic acids may also be used, in particular alkyl esters, alkoxyalkyl esters, aryl esters, cycloalkylesters, cyanoalkyl esters, hydroxyalkyl esters, and fluoroalkyl esters.

As alkyl esters $C_1$-$C_{18}$ alkyl esters of the α,β-unsaturated monocarboxylic acids are preferably used, more preferably $C_1$-$C_{18}$ alkyl esters of acrylic acid or methacrylic acid, such as methylacrylate, ethylacrylate, propylacrylate, n-butylacrylate, tert.-butylacrylate, 2-ethylhexylacrylate, n-dodecylacrylate, methylmethacrylate, ethylmethacrylate, propylmethacrylate, n-butylmethacrylate, tert.-butylmethacrylate and 2-ethylhexyl-methacrylate.

As alkoxyalkyl esters $C_1$-$C_{18}$ alkoxyalkyl esters of α,β-unsaturated monocarboxylic acids are preferably used, more preferably alkoxyalkylester of acrylic acid or methacrylic acid such as methoxy methyl(meth)acrylate, methoxy ethyl (meth)acrylate, ethoxyethyl(meth)acrylate and methoxyethyl(meth)acrylate.

It is also possible to use aryl esters, preferably $C_6$-$C_{14}$-aryl-, more preferably $C_6$-$C_{10}$-aryl esters and most preferably the aforementioned aryl esters of acrylates and methacrylates.

In another emodiment cycloalkyl esters, preferably $C_5$-$C_{12}$-cycloalkyl-, more preferably $C_6$-$C_{12}$-cycloalkyl and most preferably the aforementioned cycloalkyl acrylates and methacrylates are used.

It is also possible to use cyanoalkyl esters, in particular cyanoalkyl acrylates or cyanoalkyl methacrylates, in which the number of C atoms in the cyanoalkyl group is in the range of from 2 to 12, preferably α-cyanoethyl acrylate, β-cyanoethyl acrylate or cyanobutyl methacrylate are used. In another embodiment hydroxyalkyl esters are used, in particular hydroxyalkyl acrylates and hydroxyalkyl methacrylates in which the number of C-atoms in the hydroxylalkyl group is in the range of from 1 to 12, preferably 2-hydroxyethyl acrylate, 2-hydroxyethyl methacrylate or 3-hydroxypropyl acrylate.

It is also possible to use fluorobenzyl esters, in particular fluorobenzyl acrylates or fluorobenzyl methacrylates, preferably trifluoroethyl acrylate and tetrafluoropropyl methacrylate. Substituted amino group containing acrylates and methacrylates may also be used like dimethylaminomethyl acrylate and diethylaminoethylacrylate.

Various other esters of the α,β-unsaturated carboxylic acids may also be used, like e.g. polyethyleneglycol(meth)acrylate, polypropyleneglycole(meth)acrylate, glycidyl (meth)acrylate, epoxy(meth)acrylate, N-(2-hydroxyethyl)acrylamide, N-(2-hydroxymethyl)acrylamide or urethane (meth)acrylate.

It is also possible to use mixture of all aforementioned esters of α,β-unsaturated carboxylic acids.

Furthon α,β-unsaturated dicarboxylic acids may be used, preferably maleic acid, fumaric acid, crotonic acid, itaconic acid, citraconic acid and mesaconic acid.

In another embodiment anhydrides of 4-unsaturated dicarboxylic acids are used, preferably maleic anhydride, itaconic anhydride, itaconic anhydride, citraconic anhydride and mesaconic anhydride.

In a further embodiment mono- or diesters of α,β-unsaturated dicarboxylic acids can be used. Suitable alkyl esters are e.g. $C_1$-$C_{10}$-alkyl, preferably ethyl-, n-propyl-, iso-propyl, n-butyl-, tert.-butyl, n-pentyl-oder n-hexyl mono- or diesters. Suitable alkoxyalkyl esters are e.g. $C_2$-$C_{12}$ alkoxyalkyl-, preferably $C_3$-$C_8$-alkoxyalkyl mono- or diesters. Suitable hydroxyalkyl esters are e.g. $C_1$-$C_{12}$ hydroxyalkyl-, preferably $C_2$-$C_8$-hydroxyalkyl mono- or diesters. Suitable cycloalkyl esters are e.g. $C_5$-$C_{12}$-cycloalkyl-, preferably $C_6$-$C_{12}$-cycloalkyl mono- or diesters. Suitable alkylcycloalkyl esters are e.g. $C_6$-$C_{12}$-alkylcycloalkyl-, preferably $C_7$-$C_{10}$-alkylcycloalkyl mono- or diesters. Suitable aryl esters are e.g. $C_6$-$C_{14}$-aryl, preferably $C_6$-$C_{10}$-aryl mono- or diesters.

Explicit examples of the α,β-ethylenically unsaturated dicarboxylic acid monoester monomers include maleic acid monoalkyl esters, preferably monomethyl maleate, monoethyl maleate, monopropyl maleate, and mono n-butyl maleate;

maleic acid monocycloalkyl esters, preferably monocyclopentyl maleate, monocyclohexyl maleate, and monocycloheptyl maleate;

maleic acid monoalkylcycloalkyl esters, preferably monomethylcyclopentyl maleate, and monoethylcyclohexyl maleate;

maleic acid monoaryl ester, preferably monophenyl maleate;

maleic acid mono benzyl ester, preferably monobenzyl maleate;

fumaric acid monoalkyl esters, preferably monomethyl fumarate, monoethyl fumarate, monopropyl fumarate, and mono n-butyl fumarate;

fumaric acid monocycloalkyl esters, preferably monocyclopentylarate, monocyclohexyl fumarate, and monocycloheptyl fumarate;

fumaric acid monoalkylcycloalkyl esters, preferably monomethylcyclopentyl fumarate, and monoethylcyclohexyl fumarate;

fumaric acid monoaryl ester, preferably monophenyl fumarate;

fumaric acid mono benzyl ester, preferably rnonobenzyl fumarate;

citraconic acid monoalkyl esters, preferably monomethyl citraconate, monoethyl citraconate, monopropyl citraconate, and mono n-butyl citraconate;

citraconic acid monocycloalkyl esters, preferably monocyclopentyl citraconate, monocyclohexyl citraconate, and monocycloheptyl citraconate;

citraconic acid monoalkylcycloalkyl esters, preferably monomethylcyclopentyl citraconate, and monoethylcyclohexyl citraconate;

citraconic acid mono aryl ester, preferably monophenyl citraconate;

citraconic acid mono benzyl ester, preferably monohenzyl citraconate;

itaconic acid mono alkyl esters, preferably monomethyl itaconate, monoethyl itaconate, monopropyl itaconate, and mono n-butyl itaconate;

itaconic acid monocycloalkyl esters, preferably monocyclopentyl itaconate, monocyclohexyl itaconate, and monocycloheptyl itaconate;

itaconic acid monoalkylcycloalkyl esters, preferably monomethylcyclopentyl itaconate, and monoethylcyclohexyl itaconate;

itaconic acid mono aryl ester, preferably monophenyl itaconate;

itaconic acid mono benzyl ester, preferably monobenzyl itaconate.

As α,β-ethylenically unsaturated dicarboxylic acid diester monomers the analoguos diesters based on the above explicitely mentioned mono ester monomers may be used, wherein, however, the two organic groups linked to the C=O group via the oxygen atom may be identical or different.

As further termonomers vinyl aromatic monomers like styrol, α-methylstyrol and vinylpyridine, as well as non-conjugated dienes like 4-cyanocyclohexene and 4-vinylcyclohexene, as well as alkines like 1- or 2-butine may be used.

The proportions of conjugated diene and α,β-unsaturated nitrile in the HNBR polymers to be used can vary within wide ranges. The proportion of or of the sum of the conjugated dienes is usually in the range from 40 to 90% by weight, preferably in the range from 50 to 85% by weight, based on the total polymer. The proportion of or of the sum of the α,β-unsaturated nitriles is usually from 10 to 60% by weight, preferably from 15 to 50% by weight, based on the total polymer. The proportions of the monomers in each case add up to 100% by weight. The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or of the α,β-unsaturated nitrile or nitriles are replaced by the proportions of the additional monomers, with the proportions of all monomers in each case adding up to 100% by weight.

In one specific embodiment a hydrogenated nitrile rubber may be subjected to the present process wherein the proportion of the repeating units derived from the α,β-unsaturated nitrile is greater than 43% b.w., preferably greater than 44.5% b.w. and up to 60% b.w., more preferably greater than 44.5% b.w. and up to 52% b.w. and most preferably in the range of from 45 to 50.5% b.w. based on the total hydrogenated nitrile rubber. Hence, the proportion of or of the sum of the conjugated dienes is in such case up to 57% b.w., preferably in the range of 40 to 55.5% b.w., more preferably in the range of from 48 to 55.5% b.w., most preferably in the range of from 49.5 to 55% b.w. based on the total polymer.

Preparation of the Hydrogenated Nitrile Rubber Subjected to the Process According to the Invention:

The hydrogenated nitrile rubbers having a viscosity of at maximum 20.000 Pa*s (measured at 100° C. and a shear rate of 1/s), preferably at maximum 10.000 Pa*s, more preferably at maximum 5.000 Pa*s and most preferably at maximum 1.000 Pa*s which are contained in fluid (F) are typically prepared by 1) polymerising at least one conjugated diene, at least one α,β-unsaturated nitrile and optionally one or more further copolymerizable monomers to obtain a nitrile rubber,
2) subjecting the nitrile rubber of step 1) to a catalytic metathesis reaction optionally in the presence of a low-molecular weight 1-olefine to reduce the molecular weight of the nitrile rubber and
3) subjecting the nitrile rubber obtained in step 2) to a hydrogenation reaction in a volatile compound this being an organic solvent, resulting in an organic fluid (F) comprising the desired hydrogenated nitrile rubber and the volatile compound.

Hence, hydrogenated nitrile rubber having a viscosity of at maximum 20.000 Pa*s (measured at 100° C. and a shear rate of 1/s), preferably at maximum 10.000 Pa*s, more preferably at maximum 5.000 Pa*s and most preferably at maximum 1.000 Pa*s and being substantially free of volatile compounds can be prepared by at least the following steps 1) polymerising at least one conjugated diene, at least one α,β-unsaturated nitrile and optionally one or more further copolymerizable monomers to obtain a nitrile rubber,
2) subjecting the nitrile rubber of step 1) to a catalytic metathesis reaction optionally in the presence of a low-molecular weight 1-olefin to reduce the molecular weight of the nitrile rubber and
3) subjecting the nitrite rubber of step 2) to a hydrogenation reaction in a volatile compound this being an organic solvent, resulting in a fluid (F) comprising hydrogenated nitrile rubber having a viscosity of of at maximum 20.000 Pa*s (measured at 100° C. and a shear rate of 1/s), preferably at maximum 10.000 Pa*s, more preferably at maximum 5.000 Pa*s and most preferably at maximum 1.000 Pa*s and at least one volatile compound, and
4) removing volatile compounds from the fluid (F) by a process comprising at least the steps of:
    a) treating the fluid (F) in at least one concentrator unit comprising at least a heater, a degassing vessel (4) and a vapor line, whereby the fluid (F) is heated, the heated fluid (G) is fed into a degassing vessel where part of the volatile compounds are removed via the vapor line to obtain a concentrated fluid (H),
    b) reheating the concentrated fluid (H) from step a) in at least one reheating unit to obtain a reheated concentrated fluid (L); and
    c) feeding the reheated concentrated fluid (L) from step b) into at least one extruder unit comprising at least an extruder degassing section comprising at least a conveying section, a vent port with one or more vapor lines, a accumulating section and an outlet section, wherein a stripping agent is additionally fed to the extruder unit and wherein volatile compounds are removed through the vent ports and vapor lines;

whereby the reheated concentrated fluid (L) is free-flowing upon entering the extruder degassing section and the hydrogenated nitrile rubber obtained at the outlet section is substantially free of volatile compounds.

In one preferred embodiment the hydrogenated nitrite rubbers obtained according to the present process and being substantially free of volatile compounds comprise repeating units derived from at least one conjugated diene, at least one α,β-unsaturated nitrile and optionally one or more copolymerizable monomers, have a viscosity of of at maximum 20.000 Pa*s (measured at 100° C. and a shear rate of 1/s), preferably at maximum 10.000 Pa*s, more preferably at maximum 5,000 Pa*s and most preferably at maximum 1.000 Pa*s and possess a weight average molecular weight Mw of 50.000 g/mol or less, preferably 10.000 to 50.000 g/mol, more preferably 12.000 to 40.000 g/mol and a polydispersity (Mw/Mn) of less than 2.0. For such preferred grades it is not possible anymore to measure the Mooney viscosity as these types have a honey-like appearance and Mooney viscosities may not be measured for values below 5 Mooney units.

In another preferred embodiment the hydrogenated nitrite rubbers obtained by the process of the invention and being substantially free of volatile compounds comprise repeating units derived from at least one conjugated diene, at least one α,β-unsaturated nitrite and optionally one or more copolymerizable monomers, have a viscosity of of at maximum 20.000 Pa*s (measured at 100° C. and a shear rate of 1/s), preferably at maximum 10.000 Pa*s, more preferably at maximum 5.000 Pa*s and most preferably at maximum 1.000 Pa*s, and the weight average of the molecular weight Mw is larger than 50,000 g/mol and preferably in the range of from 50.000 to 250.000 and the polydispersity is in the range of from 2.1 to 3.0, preferably from 2.1 to less than 3, more preferably from 2.2 to 2.9, even more preferably from 2.3 to 2.9 and most preferably from 2.4 to 2.8.

Steps 1 and 2: Polymerisation and Metathesis

The preparation of nitrile rubbers by polymerization of the abovementioned monomers and the subsequent metathesis is adequately known to those skilled in the art and comprehensively described in the polymer literature. In addition nitrile rubbers which can be used for hydrogenation in step 3) are also commercially available, e.g. as products from the product range of the trade names Perbunan® and Krynac® from Lanxess Deutschland GmbH.

The polymerisation is typically carried out in emulsion and e.g. described in WO-A-2008/142042, WO-A-2008/142035 and WO-A-2008/142039.

The emulsion polymerization is typically performed in the presence of at least one chain transfer agent also well-known to the artisan and also commercially available, preferably using at least one alkyl thiol containing 12-16 carbon atoms and at least three tertiary carbon atoms, with the sulphur being bound to one of these tertiary carbon atoms.

The copolymerisation results in a NBR latex. Said latex is then subjected to steam stripping to remove e.g. unreacted monomers and afterwards to coagulation in order to isolate the NBR solid using mostly salts or acids as coagulants. The NBR is obtained in the form of wet crumbs in water, Most of the water is then be separated by draining, followed e.g. by the application of dewatering extruders and a final vacuum drying step e.g. in a tunnel dryer or a fluidized bed. Such process is e.g. described in EP-A-1 369 436.

The molecular weight degradation of nitrile rubbers obtained by emulsion polymerisation by cross-metathesis is broadly described in literature and e.g. described in WO-A-02/100905, WO-A-02/100941, WO-A-03/002613 and EP 2027920. It uses specific metathesis catalysts tolerant to polar groups, in particular the nitrile groups. It is typically carried out in a suitable organic solvent which does not deactivate the catalyst used and also does not adversely affect the reaction in any other way. Preferred solvents include, but are not restricted to dichloromethane, chloroform, 1,2-dichloroethane, 1,1,2-trichlorethane, monochlorobenzene, dichlorobenzene, trichlorobenzene, benzene, toluene, xylene, methyl ethyl ketone, ethyl acetate, acetone, tetrahydrofuran, tetrahydropyran and dioxane. The metathesis reaction may be and is preferably carried out in the additional presence of an olefin (the so-called "co-olefin") which is preferably a $C_2$ to $C_{16}$ linear or branched olefin such as ethylene, isobutene, styrene or 1-hexene. Where the co-olefin is a liquid (such as 1-hexene), the amount of co-olefin employed is preferably in the range of from 1 to 200 wt %. Where the co-olefin is a gas (such as ethylene) the amount of co-olefin employed is such that it results in a pressure in the reaction vessel in the range of from $1*10^5$ Pa to $1*10^7$ Pa, preferably in the range of from $5.2*10^5$ Pa to $4*10^6$ Pa. In certain cases the co-olefin can itself act as a solvent (for example, 1-hexene), in which case no other solvent is necessary. The metathesis reaction is carried out at a temperature in the range of from 20 to 140° C.; preferably in the range of from 60 to 120° C. The reaction time will depend upon a number of factors, including the concentration of the NBR ("cement") in the solvent, the amount of catalyst used and the reaction temperature. The metathesis is usually complete within the first 2-4 hours under typical conditions. The progress of the metathesis reaction can be monitored by standard analytical techniques, for example using GPC or solution viscosity.

Step 3: Hydrogenation

The hydrogenation of nitrile rubbers is also known in the art and can be performed with homogeneous or heterogeneous hydrogenation catalysts. It is also possible to carry out the hydrogenation in situ, i.e. in the same reaction vessel in which the metathetic degradation has previously also been carried out and without the necessity of isolating the degraded nitrile rubber. The hydrogenation catalyst is then simply added to the reaction vessel.

The catalysts used are usually based on rhodium, ruthenium or titanium, but it is also possible to use platinum, iridium, palladium, rhenium, osmium, cobalt or copper either as metal or preferably in the form of metal compounds (cf., for example, U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. No. 4,464, 515 and U.S. Pat. No. 4,503,196).

Suitable catalysts and solvents for a hydrogenation in the homogeneous phase are described below and are also known from DE-A-25 39 132 and EP-A-0 471 250.

The selective hydrogenation can be achieved, for example, in the presence of a rhodium- or ruthenium-containing catalyst. It is possible to use, for example, a catalyst of the general formula $R^1{}_mB)_1MX_n$, where M is ruthenium or rhodium, the radicals $R^1$ are identical or different and are each a $C_1$-$C_8$-alkyl group, a $C_4$-$C_8$-cycloalkyl group, a $C_6$-$C_{15}$-aryl group or a $C_7$-$C_{15}$-aralkyl group. B is phosphorus, arsenic, sulphur or a sulphoxide group S=O, X is hydrogen or an anion, preferably halogen and particularly preferably chlorine or bromine, l is 2, 3 or 4, m is 2 or 3 and n is 1, 2 or 3, preferably 1 or 3.

Preferred hydrogenation catalysts of the above general formula are tris(triphenylphosphine) rhodium(I) chloride, tris (triphenylphosphine)rhodium(III) chloride and tris(dimethyl sulphoxide) rhodium(III)chloride and also tetrakis(triphenylphosphine)rhodium hydride of the formula $(C_6H_5)_3P)_4$ RhH and the corresponding compounds in which the triphenylphosphine has been completely or partly replaced by tricyclohexylphosphine.

When using the aforementioned hydrogenation catalysts $(R^1{}_mB)_1MX_n$ it is typically appropriate to additionally use a cocatalyst which is a ligand of the formula $R^1{}_mB$, where $R^1$, m and B have the meanings given above for the catalyst. Preferably, m is 3, B is phosphorus and the radicals $R^1$ can be identical or different. Preference is given to cocatalysts having trialkyl, tricycloalkyl, triaryl, triaralkyl, diarylmonoalkyl, diaryl-monocycloalkyl, dialkyl-monoaryl, dialkyl-monocycloalkyl, dicycloalkyl-monoaryl or dicycloalkyl-monoaryl radicals. Examples of cocatalysts may be found in, for example, U.S. Pat. No. 4,631,315. A preferred cocatalyst is triphenylphosphine. The cocatalyst is preferably used in amounts in the range from 0 to 5% by weight, preferably in the range from 0.3 to 4% by weight, based on the weight of the nitrile rubber to be hydrogenated. Furthermore, the weight ratio of the rhodium-containing catalyst to the cocatalyst is preferably in the range from 1:3 to 1:55, more preferably in the range from 1:5 to 1:45. Based on 100 parts by weight of the nitrile rubber to be hydrogenated, it is appropriate to use from 0 to 33 parts by weight of the cocatalyst, preferably from 0.3 to 20 parts by weight and very particularly preferably from 0.5 to 5 parts by weight, in particular more than 0.5 but less than 3 parts by weight, of cocatalyst per 100 parts by weight of the nitrile rubber to be hydrogenated.

The hydrogenation catalyst can be utilized in small amounts. An amount in the range from 0.01 to 1% by weight, preferably in the range from 0.02 to 0.5% by weight and particularly preferably in the range from 0.025 to 0.1% by weight, based on the weight of the NBR polymer, is suitable. Additionally Grubbs-type metal organic complex catalysts (as described in WO-A-02/100905. WO-A-02/100941 and WO-A-03/002613) which are otherwise typically used in metathesis reactions but also show catalytic activity, can be used for hydrogenation purposes, too (e.g. Grubbs I and Grubbs II)

The practical implementation of this hydrogenation is adequately known to those skilled in the art from U.S. Pat. No. 6,683,136. It is usually carried out by treating the nitrile rubber to be hydrogenated in a solvent such as dichloromethane, chloroform, 1,2-dichloroethane, 1,1,2-trichlorethane, monochlorobenzene, dichlorobenzene, trichlorobenzene, benzene, toluene, xylene, methyl ethyl ketone, ethyl acetate, acetone, tetrahydrofuran, tetrahydropyran and dioxane with hydrogen at a temperature in the range from 100 to 150° C. and a pressure in the range from 50 to 150 bar for from 2 to 10 hours.

For the purposes of the present invention, hydrogenation is a reaction of the double bonds present in the starting nitrile rubber to an extent of at least 50%, preferably 70-100%, particularly preferably 80-100%.

When heterogeneous catalysts are used, these are usually supported catalysts based on palladium which are, for example, supported on carbon, silica, calcium carbonate or barium sulphate.

EXPLANATION OF FIGURES

The equipment suitable to perform the process according to the invention will be described in more detail by means of schematic drawings in which.

A BASIC AND EXEMPLARY EMBODIMENT OF THE PROCESS STEP IS SHOWN IN FIG. 1

Figure 1:
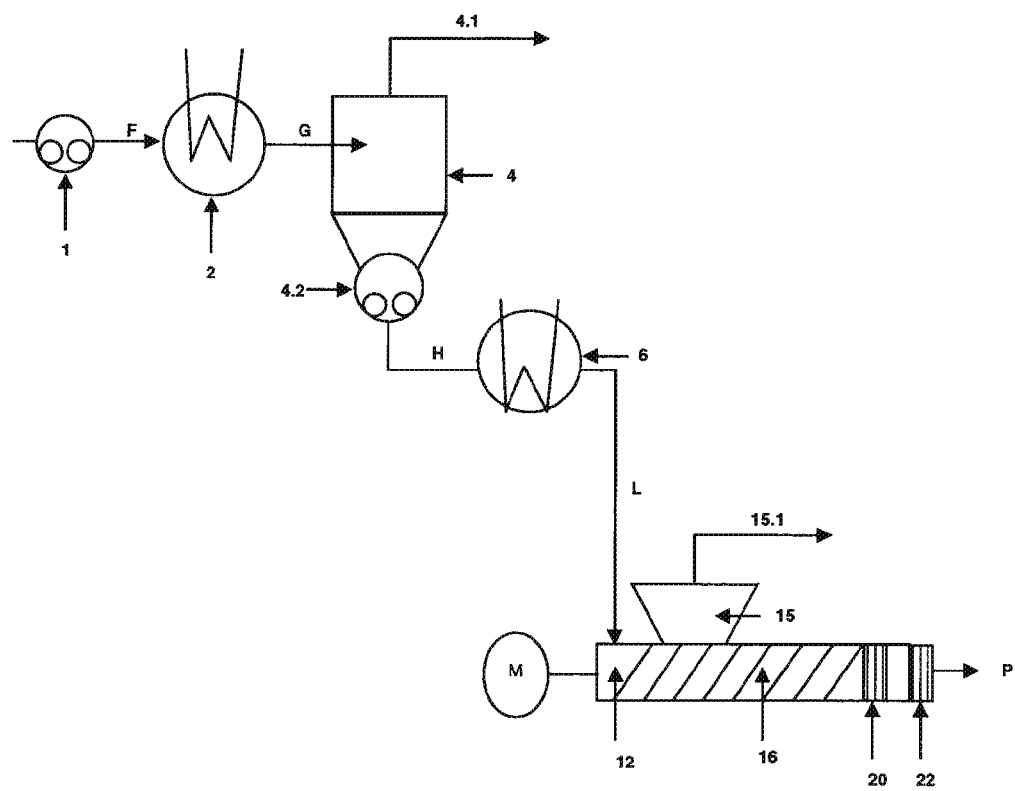
FIG. 1 shows a single-stage concentrator unit, a reheating unit and an extruder unit comprising one extruder degassing section, one accumulating section and one outlet section.

In step a) Fluid F containing at least one non-volatile hydrogenated nitrile rubber polymer and at least one volatile compound is transferred via pump 1 to the heater 2, where the fluid F is heated.

Fluid F, also called cement, contains for example from 3 to 50 wt % of a non-volatile hydrogenated nitrile rubber polymer (i) and from 50 to 97 wt % volatile compounds (ii), this being in particular an organic solvent, whereby the aforementioned components (i) and (ii) add up to 90 to 100, preferably 95 to 100 wt % of the total mass of fluid F.

The volatile compound(s) comprise preferably organic solvents, more preferably selected from the group comprising dichloromethane, chloroform, 1,2-dichloroethane, 1,1,2-trichlorethane, monochlorobenzene, dichlorobenzene, trichlorobenzene, benzene, toluene, xylene, methyl ethyl ketone, ethyl acetate, acetone, tetrahydrofuran, tetrahydropyran and dioxane.

In a preferred embodiment of the invention, fluid F contains a non-volatile hydrogenated nitrile rubber polymer in the range from 3 to 50 wt % volative organic compound(s), in particular one or more organic solvents, in a range from 50 to 95 wt % and water in a range from 0.5 to 20 wt % whereby the aforementioned components add up to 95 to 100 wt % of the total mass of fluid F.

As outlined above the fluid F is typically obtained from the hydrogenation reaction. Very small amounts of water may result from the organic solvent used during hydrogenation or the preceding metathesis reaction, or from the NBR, the co-catalyst used during hydrogenation, if any, or the co-olefin used for metathesis, if any. In the alternative water in Fluid F may result from the addition of pure water or by the addition of aqueous solutions of appropropriate additives after hydrogenation. Appropriate additives are inorganic or organic bases such as lithium hydroxide, sodium hydroxide, potassium hydroxide, ammonia, urea, guanidines etc. It may be advisable to add such aqueous solutions of inorganic or organic bases bases in order to neutralize hydrochloric acid which is formed as a by product during the hydrogenation of NBR, especially when monochlorobenzene is used as a solvent.

Temperature of Fluid F:

Fluid F entering the heater typically and preferably has a temperature of 10° C. to 100° C., preferably of 20° C. to 80° C. The viscosity of fluid F is for example in the range of 100 mPa*s to 75.000 mPa*s, preferably in the range of 500 mPa*s to 5.000 mPa*s A heater may be any device that is able to raise the temperature of Fluid F. In a preferred embodiment, heater 2 is a heat exchanger. The heating medium is selected from the group consisting of steam, heating oil or hot pressurized water. The heat exchanger is for example of shell-and-tube type, where the fluid F is inside the tubes and the heating medium is on the shell side. Special inserts in the tubes may be applied to enhance heat transfer. Another type of heat exchanger may also be used, in which fluid F is on the outside of the heat exchanger tubes. The advantage of the aforementioned types of heat exchangers is the avoidance of maldistribution and easy maintenance as well as good heat transfer. Said heat exchangers are well known and commercially available. In a less preferred embodiment Plate type heat exchangers may also be applied.

Temperature of Heated Fluid G:

Upon heating, heated fluid G is obtained. The heated fluid G has a higher temperature than fluid F, preferably a temperature of 100 to 250° C., more preferably 110° C. to 200° C. and even more preferably 120° C. to 190° C.

The heated fluid G is then conveyed further into a degassing vessel 4. In the degassing vessel, the volatile compounds at least partially evaporate. The vapors are separated and removed from the heated fluid G by a vacuum line 4.1. The pressure in the degassing vessel 4 is for example in the range of 100 hPa to 4.000 hPa, preferably in the range of 200 hPa and 2.000 hPa and more preferred in the range of 230 to 1.100 hPa.

The vapors removed via the vacuum line 4.1 are preferably condensed and recycled into the process for preparation of fluid F. After degassing and separation a concentrated fluid H is obtained, which is removed from the degassing vessel 4 by means of a pump 4.2.

In a preferred embodiment of the invention the degassing vessel is designed in the shape of a cyclone to further aid separation of vapor from heated fluid G. In another preferred embodiment of the invention the degassing vessel 4 has a conical or at least torispherical shaped bottom, to allow the vessel being emptied completely or substantially complete.

In another embodiment the inner surface of the degassing vessel can be heated.

The pump 4.2 is preferably directly connected to the outlet of the degassing vessel 4. In general, the connection piece between pump and vessel is preferably as short as possible.

Due to the high viscosity of the concentrated fluid H at this stage, the inlet of the pump is preferably designed with a large inlet, thereby reducing the pressure drop at the inlet.

The pump 4.2 may be selected from the group consisting of positive displacement type pumps, gear pumps, piston pumps, membrane pumps, screw type pumps, extruder type pumps like counter-rotating or co-rotating single or twin screw extruders or kneader type pumps. Positive displacement type pumps and gear pumps are preferred, gear pumps are even more preferred.

In another preferred embodiment the pump 4.2 comprises a combination of an extruder or a kneader and a gear pump whereby the gear pump is fed from the extruder or kneader.

The amount of volatile compounds that is removed in this step a) is for example dependent on the temperature of fluid G and the pressure in the degassing vessel 4. In a preferred embodiment of the invention the temperature of fluid G and the pressure in the degassing vessel 4 are chosen so that the concentrated fluid H is still free-flowing as defined above and comprises for example from 10 to 60, preferably from 25 to 60 wt % of a non-volatile hydrogenated nitrile rubber polymer and from about 40 to about 90, preferably from 40 to 75 wt % volatile compounds whereby the aforementioned components non-volatile hydrogenated nitrile rubber polymer, volatile organic compound and water add up to 90 to 100 wt %, preferably to 95 to 100 wt % of the total mass of fluid H.

In a preferred embodiment and where the feedstock fluid F comprises water, fluid H for example comprises from 10 to 60, preferably from 25 to 60 wt % of the non-volatile hydrogenated nitrile rubber, from about 25 to about 90, preferably from 25 to 75 wt % volatile organic compounds, in particular a solvent, and about 0.5 to about 15 wt % water, whereby the aforementioned components non-volatile polymer, volatile organic compound and water add up to 90 to 100 wt %, preferably 95 to 100 wt % of the total mass of fluid H.

Temperature of Concentrated Fluid H:

The temperature of the concentrated fluid H is lower than that of heated fluid G and is for example in the range of 15 to 150° C., preferably in the range of 20 to 120° C., The concentrated fluid H is still free-flowing as defined above.

Step b) of the Process According to the Invention:

In step b), the concentrated fluid H obtained in step a) is then passed through a reheating unit 6 to obtain a reheated concentrated fluid L. In a preferred embodiment the reheating unit comprises a heat exchanger, whereby the same disclosure including the preferences with regard to heating media and heat exchanger types apply as described above for heat exchanger 2.

The temperature of the reheated concentrated fluid L is higher than that of the concentrated fluid H and is for example in the range 50° C. to 250° C., preferably in the range of 90° C. to 180° C. The reheated concentrated fluid L is still free-flowing with the viscosity in the ranges as defined above.

Step c) of the Process According to the Invention:

In step c), the reheated concentrated fluid L obtained in step b) is passed on to a extruder unit and fed into the conveying section 16 of the extruder degassing section at the feeding point 12.

Suitable extruder types include single screw and multi-screw extruders comprising any number of barrels and types of screw elements and other single or multishaft conveying kneaders. Possible embodiments of multiscrew extruders are twin-screw extruders, ring extruders or planetary roller extruders, whereby twin-screw extruders and planetary roller extruders are preferred.

Single screw extruders include those having an axial oscillating screw. Twin screw extruders are for example counter-rotating intermeshing, counter-rotating non-intermeshing, co-rotating intermeshing and co-rotating non-intermeshing twin screw extruders, whereby co-rotating intermeshing twin screw extruders are preferred.

In a further embodiment of the present process it is also possible to use two or more of the above described extruders in a consecutive manner.

In one embodiment of the invention the extruders can either be heated via the barrels to temperatures up to 300° C. or cooled.

In a preferred embodiment, the extruder comprises means to operate separate zones independently of each other at different temperatures so that the zones can either be heated, unheated or cooled. In another preferred embodiment the extruder comprises for each conveying section at least one separate zone, which can be operated independently at different temperatures.

Preferred extruder materials should be non-corrosive and should substantially prevent the reheated concentrated fluid L and the Product P from being contaminated with metal or metal ions. Preferred extruder materials include nitrided steel, duplex steel, stainless steel, nickel-based alloys, composite materials like sintered metals, hot isostatic pressed materials, hard wear resistant materials like Stellite, coated metals with coatings for example made from ceramics, titanium nitride, chromium nitride and diamond-like carbon (DLC).

The conveying section 16 is open to a vent port 15. In the conveying section 16 a part of the solvent is evaporated and separated from the reheated concentrated fluid L. The vapors are removed through the vent port 15 via a vapor line 15.1.

Since the evaporation volatile compounds have a tendency to entrain the reheated concentrated fluid L or the Product P towards the vent ports, in a preferred embodiment of the invention the vent ports 15 are designed to prevent the material, in particular the reheated concentrated fluid L or the Product P, from coming out of the vent ports.

Suitable means to accomplish that purpose are stuffer screws, that are mounted on the vent ports and convey any material back into the extruder, or rollers or belts, that are applied to the inside of the vent ports to push deposited material back into the extruder. As an alternative or in addition to the aforementioned, coatings of the vent ports may be applied which reduce or prevent sticking of the material to the surface. Suitable coatings include DLC (Diamond like carbon), Ethylene-Tetrafluoroethylene (ETFE), Polytetrafluoroethylene (PTFE) and Nickel-Alloys.

The pressure at the vent port 15 is for example between 1 hPa and 2,000 hPa, preferably between 5 hPa and 900 hPa.

The vapor line 15.1 may be and is preferably connected to a condensing system.

In general, the purpose of the condensing system is to collect volatile compounds removed by the vent ports via the vapour lines and typically comprises a condenser and a vacuum pump. Any condensing system known in the art may be used to effect the recovery of volatile compounds.

Generally, it is preferred to recycle the condensed volatile compounds, optionally after carrying out a phase separation to separate the volatile organic compounds from water, into a process for the preparation of fluid F.

The conveying section 16 is terminated by a accumulating section 20. The purpose of the accumulation is to assure a certain pressure level in the vent port 15 and to introduce mechanical energy into the material to facilitate evaporation of volatile compounds. The accumulating section 20 may comprise any means that enable the accumulation of the material. It may be designed to include for example kneading or throttling elements, blister discs or die plates.

Examples of throttling elements are conical or cylindrical flow paths or other throttling means.

The application of kneading elements, blister discs or die plates within the accumulating section is preferred, kneading elements are even more preferred. Examples of kneading elements include kneading blocks, which may be designed as double or triple flighted forward, backward or neutral conveying kneading blocks; single or double flighted screw mixing elements with grooves, single flighted tooth mixing elements, blister plates and single, double or triple flighted eccentric discs. The kneading elements may be assembled in any combination on the screw shafts of the extruder, in particular of an twin screw counter rotating or co-rotating twin screw extruder.

A typical accumulating section comprises of 2 to 10 kneading blocks, oftentimes terminated by a back conveying type of kneading element. For mixing in of a stripping agent, tooth type elements or screw elements with grooves may be applied.

Eccentric discs are preferably applied in the last section of the extruder, where the product P is highly viscous and substantially free of volatile compounds.

For planetary roller extruders, kneading elements like tooth shaped rollers are or rollers with grooves and clearances are preferred.

Generally the extruder unit may comprise one or more conveying sections and one or more accumulating sections, whereby the number is only limited by constructional constraints. A typical number of conveying sections and accumulating sections is 1 to 30, preferably 2 to 20 and more preferably 3 to 15.

The last accumulating section 20 is typically designed to form a product plug at the outlet of the extruder, thereby preventing surrounding air from entering the extruder. While passing from the conveying section 16 and the accumulating section 20 to the outlet section 22 the reheated concentrated fluid L undergoes a transition from the free-flowing reheated concentrated fluid L to the product P, which typically has depending on the molecular weight a honey-like, waxy or solid appearance.

In case the hydrogenated nitrile polymer rubber, i.e. the product P has a solid appearance the outlet section 22 typically comprises means to allow the product to exit the extruder and optionally but preferably product processing equipment. Examples of suitable product processing equipment includes combinations of die plates and cutters; die plates und underwater-pelletizing means; means for crumb formation like screw elements with teeth and holes; turbulators which may be designed as cylinders with holes in it, whereby the product is pressed from the outside to the inside of the cylinder, and whereby a rotating knife inside the cylinder cuts the product into pieces; fixed knifes placed at the end plate of the extruder, whereby the screw rotation causes the cutting action, which preferably is applied when working with twin screw co-rotating, single screw and planetary roller extruders.

To reduce the mechanical and thermal stress to the product, in a preferred embodiment of the invention the product processing equipment is combined with cooling means.

The cooling means comprises any means that allow the removal of heat from the product. Examples of cooling means include heat exchangers (in particular tube bundle heat exchangers), pneumatic crumb conveyers with convective air cooling, vibrating crumb conveyers with convective air cooling, vibrating crumb conveyer with cooled contact surfaces, belt conveyer with convective air cooling, belt conveyer with cooled belts, water spraying on hot crumbs upon outlet of the extruder and as already mentioned underwater-pelletizing means, whereby water serves as the coolant.

In case the nitrile polymer rubber, i. e. the product P, does not have a crumbly, but more honey like or waxy appearance, i.e. when having a viscosity of at maximum 20.000 Pa*s, preferably at maximum 10.000 Pa*s, more preferably at maximum 5.000 Pa*s and most preferably at maximum 1.000 Pa*s and a weight average molecular weight Mw of 50.000 g/mol or less, preferably 10.000 to 50.000 g/mol, more preferably 12.000 to 40.000 g/mol and a polydispersity (Mw/Mn) of less than 2.0 the outlet section 22 typically comprises means to allow the product to exit the extruder and optionally product cooling equipment. The cooling equipment comprises any means that allow the removal of heat from the product. Examples of cooling equipment include heat exchangers (in particular tube bundle heat exchangers), belt conveyors with convective air cooling, belt conveyors with cooled belts, water spraying on hot product or a water bath, whereby water serves as the coolant.

The Product P may then be processed further for final packing and shipping:

Therefore, crumbly like hydrogenated nitrile rubber is formed into bales e.g. by a hydraulic press, and then packed into boxes or crates for shipment. For so-called "liquid" grades of hydrogenated nitrile rubber (having a honey-like or waxy appearance) appropriate containers have to be used.

In general, an increasing feed rate of the reheated concentrated fluid L at the feeding point 12 requires a corresponding increase in the screw speed of the extruder. Moreover, the screw speed determines the residence time of fluid L. Thus, the screw speed, feed rate and the extruder diameter are typically interdependent. Typically the extruder is operated in such a manner that the dimensionless throughput $V/n*d^3$, wherein V denotes the Volume flow rate, n the screw speed expressed in revolutions per minute and d the effective diameter of the extruder is adjusted to about 0.01 to about 0.2 preferably to about 0.015 to about 0.1. The maximum and minimum feed rates and extruder screw speeds are determined by for example the size of the extruder, the physical properties of the synthetic rubber product contained in Fluid L and the target values of remaining volatile compounds. Given these properties, however, the operating parameters can be determined by one skilled in the art by some initial experiments.

In one embodiment of the invention the extruder is operated at a feed rate of 5 to 25,000, preferably of 5 to 6,000 kilograms per hour.

Additionally a stripping agent is added to the extruder unit which is then removed together with other volatile compounds. Such stripping agent substantially improves the degassing achievable in the extruder. Even though the stripping agent may be added anywhere in the extruder unit, the addition in one or more accumulating sections is preferred. In a more preferred embodiment a stripping agent is added in one or more accumulating sections except the last one (20).

Suitable stripping agents are substances that are inert to the reheated concentrated fluid (L) and/or the product (P) and have a vapor pressure greater than 100 hPa at 100° C.

In the context of the invention, the term "inert" means that the stripping agent does not or virtually not react with the hydrogenated nitrile polymer contained in the reheated concentrated fluid (L) and the product (P). Suitable stripping agents are nitrogen, carbon dioxide, carbon monoxide, noble gases, methane, ethane, propane, butane, isobutane, pentane, hexane, cyclohexane, ethlylene, propene, isobutene, butadiene, natural gas, acetone, methylethylketone, methanol, ethanol, diethylether, tetrahydrofurane, water or a mixture of the aforementioned substances. The amount of stripping agent may be chosen in the range from 0.0001 to 10, preferably 0.001 to 5 and more preferably 0.1 to 2 wt-% based on the amount of the hydrogenated nitrile rubber obtained at the outlet section.

The process according to the present can be performed in a device comprising a least
- one concentrating unit comprising a heater (2) in communication with a degassing vessel (4), whereby the bottom part of the degassing vessel (4) is in communication with a pump (4.2) the upper part of the degassing vessel (4) is in communication with at least one vapour line (4.1)
- one heating unit (6) in communication with the pump (4.2) of the concentrating unit and a feeding point (12) on an extruder unit
- one extruder unit comprising at least one feeding point (12), one extruder degassing section (16), one accumulating section (20) and one outlet section (22), whereby the extruder degassing section (16) further comprises at least one vent port (15) connected to a vapour line (15.1).

In the context of this invention the term "in communication" includes direct or indirect connections whereby indirect connections may be accomplished for example via tubes or pipes. The term "in communication" further includes the option that between the units or means in communication further units or means are arranged.

Figure 2:
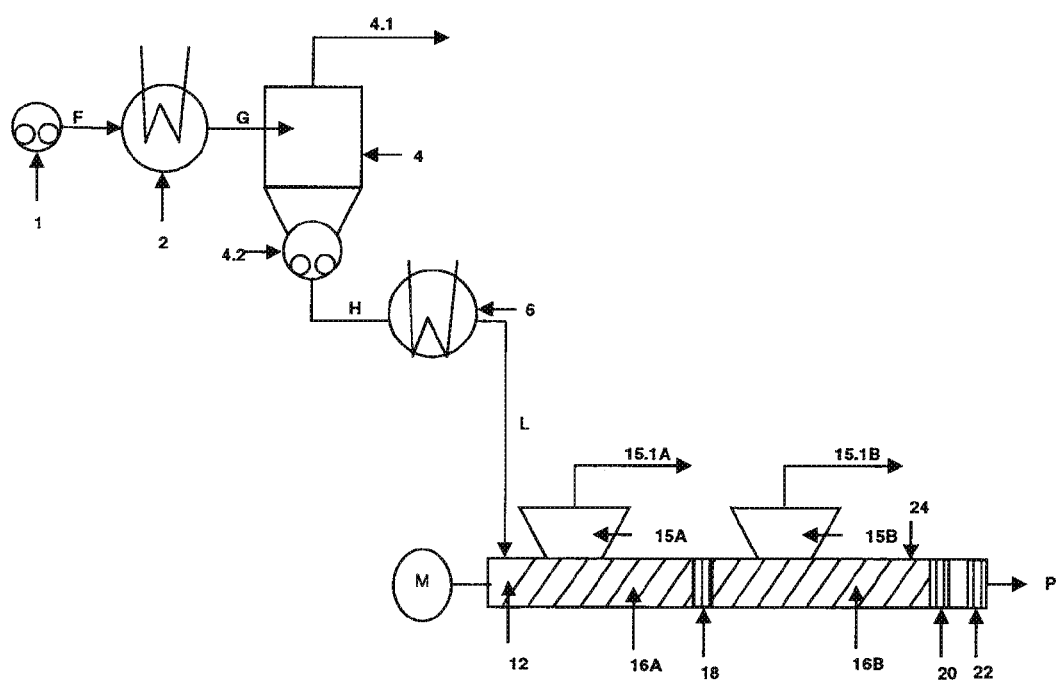
FIG. 2 shows a single-stage concentrator unit, a reheating unit and an extruder unit comprising two extruder degassing sections, two accumulating sections and one outlet section.

One Embodiment on how to Perform the Present Process is Shown in FIG. 2

FIG. 2 shows another flow chart and suitable device for the accomplishment of the process according to the invention comprising a concentrator unit with a pump 1, a heater 2, a degassing vessel 4, a vapour line 4.1 and a pump 4.2, a reheating unit comprising a heater 6 and an extruder unit comprising two extruder degassing sections having two conveying sections 16A and 16B each connected to a vent port 15 A and 15 B and a vapour line 15.1A and 15.1.B, two accumulating sections 18 and 20 terminating the conveying sections 16 A and 16 B a an outlet section 22. In addition to that the extruder unit further comprises a side feeder 24.

Generally, the extruder unit may comprise one or more side feeders, which may positioned anywhere in the extruder, preferably in close proximity to the feeding point or the outlet section 22. Side feeders are suitable for the addition of additives to the polymer.

Examples of additives, in particular for hydrogenated nitrile rubber products include stabilizing agents, acid scavengers like ESBO (epoxidized soy bean oil), stearates like calcium-stearate antioxidants and the like. Examples of suitable antioxidants include sterically hindered phenols like butythydroxytoluenes and its derivatives like Irganox® 1010, 1076, Vulkanox® KB, Vulkanox® BKF, and Wingstay® L. amines, mercapto-benzimidazoles. Methyl-2-mercaptobenzimidazol, alkylated diphenylamines like butylated and octlyated diphenylamine, polymerized 2,2,4-trimethyl-1,2-dihydrochinolin (Vulkanox® HS) certain phosphites like tris(nonylphenyl)phosphite and the like.

In particular, hydrogenated nitrile rubbers may be mixed e.g. with 0.0001 to 4 phr epoxidized soy bean oil (ESBO), 0.0001 to 5 phr calcium-stearate and 0.0001 to 0.5 phr of antioxidants (phr=parts per hundred rubber with respect to rubber weight). Other additives are also applicable, dependent on the application of the hydrogenated nitrile rubber product, i.e. fillers or colorants.

As an alternative or in addition to that, additives may also already be added to the fluid F or, as far as they are liquid together with the stripping agent.

Figure 4:
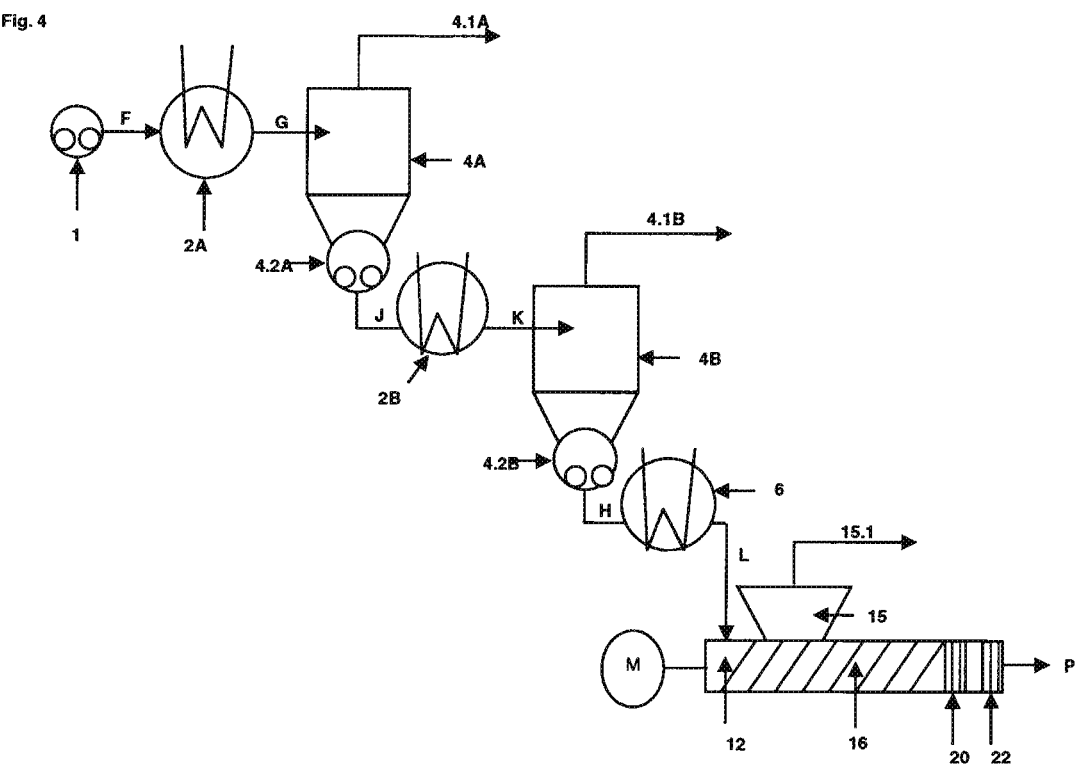
FIG. 4 shows a double-stage concentrator unit, a reheating unit and an extruder unit comprising one extruder degassing section, one accumulating section and an outlet section.

A Further Embodiment of the Process Pursuant to the Invention is Shown in FIG. 4

In this embodiment step a) is repeated a least once, preferably once or twice. The advantage of repeating step a) is that the total energy consumption to produce the concentrated fluid H can be significantly reduced due to easier operation by parameter optimization for each concentration unit. The repetition of step a) is preferably accomplished by connecting the respective number of concentrating units in series.

FIG. 4 shows the flow chart and suitable device for such accomplishment of the process according to the invention comprising a double-stage concentrator unit with a pump 1, a first concentrator unit comprising heater 2A, degassing vessel 4A equipped with a vapour line 4.1A and a pump 4.2A, a second concentrator unit comprising heater 2B, degassing vessel 4B equipped with a vapour line 4.1B and a pump 4.2B, a reheating unit comprising a heater 6 and an extruder unit comprising two extruder degassing sections having two conveying sections 16A and 16B each connected to a vent port 15 A and 15 B and a vapour line 15.1A and 15.1.B, two accumulating sections 18 and 20 terminating the conveying sections 16 A and 16 B a an outlet section 22. The heated fluid G is subjected to the first concentration stage, thereby obtaining pre-concentrated fluid J, which is then reheated by heater 2B to obtain the reheated pre-concentrated fluid K, which is then subjected to the second concentration stage, whereby concentrated fluid H is obtained. Concentrated fluid H is then processed further as described above.

In a preferred embodiment of the process according to the invention the concentration unit, the reheating unit or the extruder unit may independently of each other be equipped with one or more pressure regulation devices which allow the very precise operation of the units under predefined conditions.

The pressure regulation devices may be active or passive, whereby active pressure regulation devices are preferred. Examples of active pressure regulation devices include control valves like a pressure relief valve, examples of passive pressure regulation devices include nozzles and dies or orifice plates. Suitable valves may be selected from ball, piston, gate or needle valves.

In case of a passive pressure control device, it is preferred to calculate an orifice to cause a certain pressure drop. The calculation is based on viscosity of the fluid at that point and the throughput. Anyone skilled in the art can perform this calculation.

Active pressure control devices are typically controlled by a pressure measurement upstream of the device. The pressure is for example measured and compared to the set point. The pressure control device is then adjusted according to the offset recognized.

Alternatively the pressure drop across the device is measured instead of the absolute pressure upstream of the pressure control device. The valve position is adjusted manually, electrically, pneumatically or hydraulically. The control of the valve position, i.e. adjustment to the set point pressure, can for example be made manually or from any automated process control system.

Figure 3:
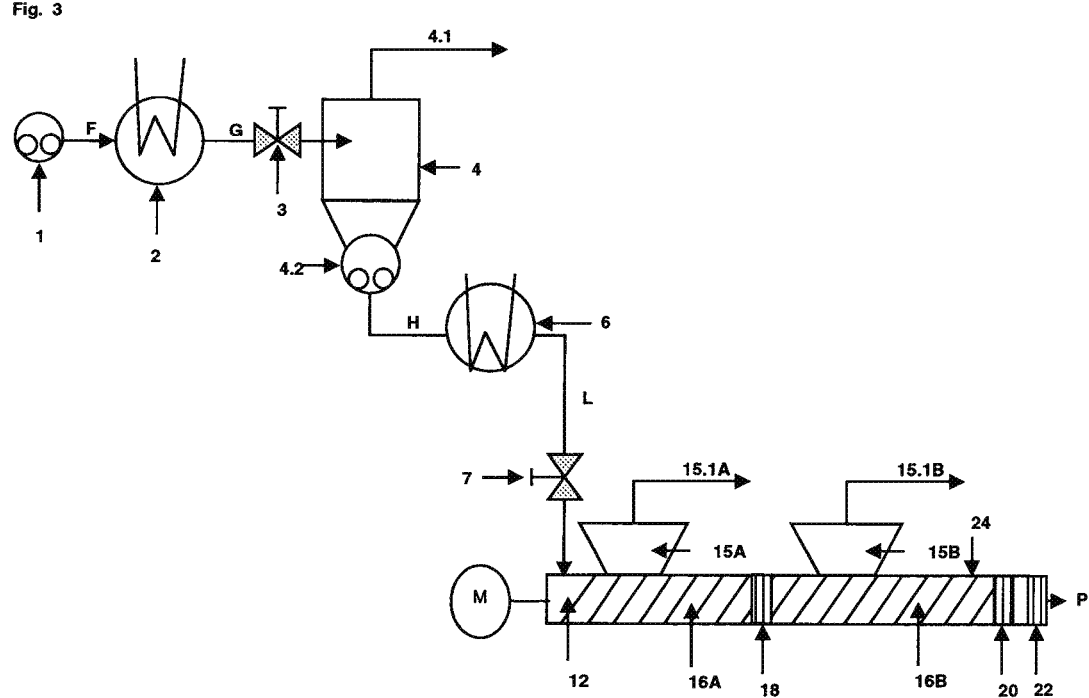
FIG. 3 shows a single-stage concentrator unit having a pressure relief valve, a reheating unit and an extruder unit having a pressure relief valve and further comprising two extruder degassing sections, two accumulating sections, a side feeder and an outlet section.

Another Embodiment of the Present Process having Additional Pressure Control Devices is Shown in FIG. 3

Apart from the pressure control devices such embodiment is very similar to FIG. 2. The pressure of heated fluid G is controlled by the pressure control device 3, the pressure of reheated, concentrated fluid L entering the extruder is controlled by the pressure control device 7.

In a preferred embodiment of the process according to the invention the reheated concentrated fluid (L) is injected into the first extruder degassing section of the extruder unit, whereby the first extruder degassing section comprises one or more rear vent ports in upstream direction each connected to a vapor line.

The advantage of rear vent ports is that the volatile compounds present in the reheated concentrated fluid L undergo sudden and rapid evaporation, thereby effecting at least partial separation of the synthetic rubber product and the volatile compounds, the vapors emerging through the rear vents in upstream direction. Generally, from about 50 to about 99 wt-%, of the volatile compounds present in the fluid L is removed through the upstream vents.

Figure 5:
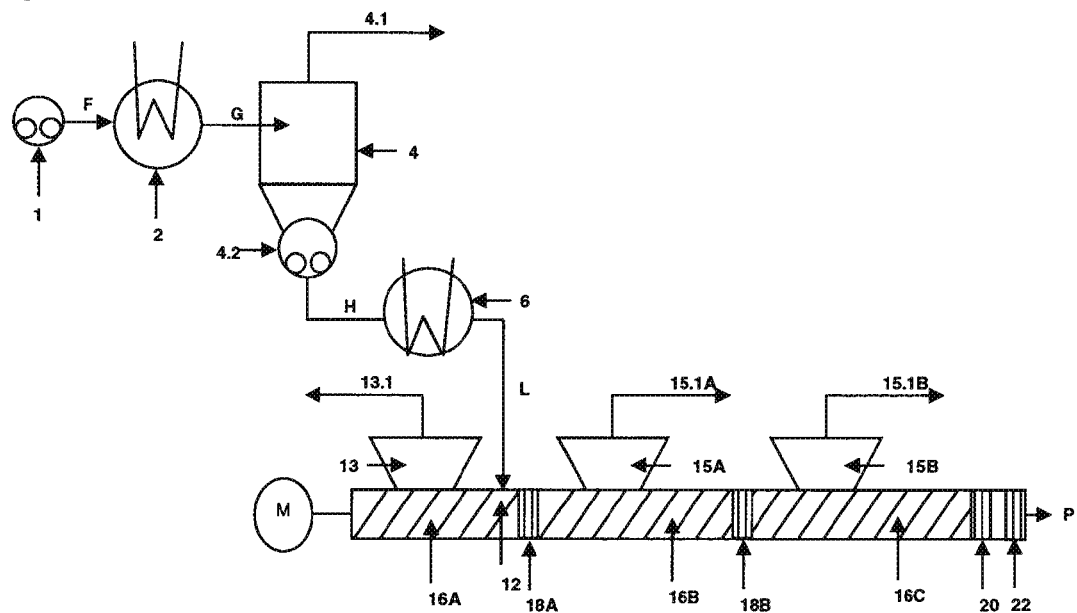
FIG. 5 shows a single-stage concentrator unit, a reheating unit and an extruder unit comprising three extruder degassing sections, three accumulating sections and one outlet section, whereby one extruder degassing section is a backward degassing section.

An Example of this Embodiment is Shown in FIG. 5.

FIG. 5 shows another flow chart and suitable device for the accomplishment of the process according to the invention comprising a single-stage concentrator unit with a pump 1, a concentrator unit comprising heater 2, degassing vessel 4 equipped with a vapour line 4.1 and a pump 4.2, a reheating unit comprising a heater 6 and an extruder unit comprising three extruder degassing sections, whereby the feeding point 12 located at the first extruder degassing section, comprising a conveying section 16A, a rear vent port 13 connected to a vapor line 13.1 in upstream direction and whereby the extruder unit further comprises two downstream extruder degassing sections each comprising a conveying section 16B and 16C, a vent port, 15 A and 15B, whereby the vent ports 15A and 15B are each connected to a vapour line 15.1A and 15.1B, and whereby each of the conveying sections 16A, 16B and 16C is terminated by a accumulating section 18A, 18B and 20 and whereby the extruder unit further comprises an outlet section 22. Generally the streams are processed as described above with the difference being that large amounts of fluid compounds present in the reheated concentrated fluid L are already removed via vent port 13 and the vapour line 13.1 connected thereto.

Figure 6:
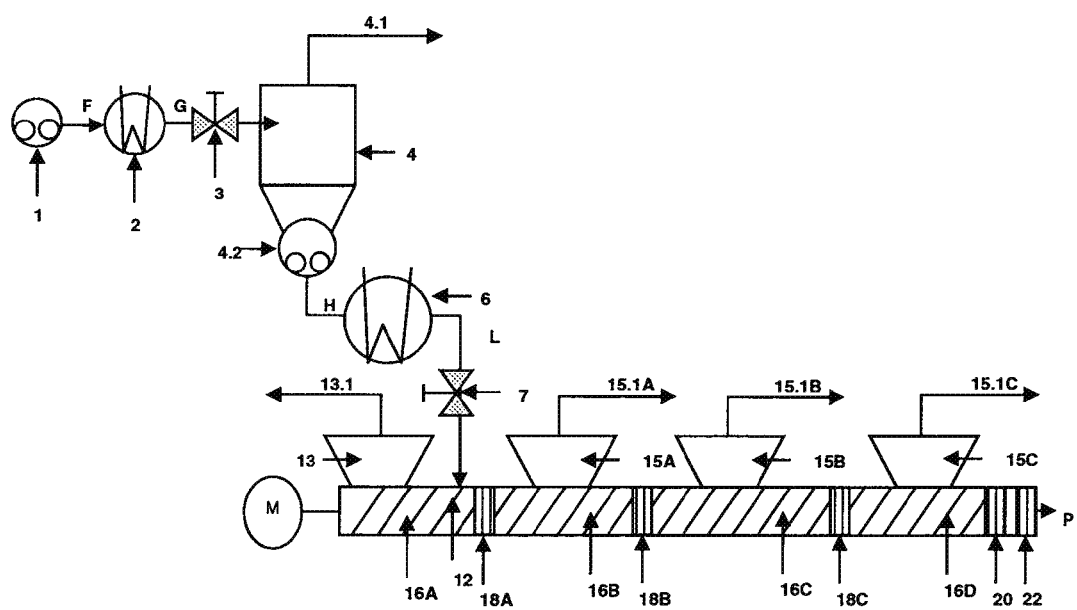
FIG. 6 shows a single-stage concentrator unit comprising a pressure regulation device, a reheating unit and an extruder unit comprising a pressure regulation device, four extruder degassing sections, four accumulating sections and one outlet section, whereby one extruder degassing section is a backward degassing section.

Another Example of this Embodiment is Shown in FIG. 6

FIG. 6 shows another flow chart and suitable device for the accomplishment of the process according to the invention comprising a single-stage concentrator unit with a pump 1, a concentrator unit comprising a pressure control device 3, a heater 2, a degassing vessel 4 equipped with a vapour line 4.1 and a pump 4.2, a reheating unit comprising a heater 6 and an extruder unit comprising a pressure control device 7 upstream the feeding point 12 of the extruder, four extruder degassing sections, whereby the feeding point 12 is located at the first extruder degassing section, whereby the first extruder degassing section comprises a conveying section 16A, a rear vent port 13 connected to a vapor line 13.1 in upstream direction and whereby the extruder unit further comprises three downstream extruder degassing sections each comprising a conveying section, 16 B. 16C and 16D, a vent port, 15A, 15B and 15C, whereby the vent ports 15A, 15B and 15C are each connected to a vapour line 15.1A, 15.1B and 15C, and whereby each of the conveying sections 16A, 16B, 16C and 16D is terminated by a accumulating section 18A, 18B, 18C and 20 and whereby the extruder unit further comprises an outlet section 22. Generally, the streams are processed as described above.

Fluid F, which is fed into the heater 2 typically, and as already disclosed above, contains for example from 3 to 50 wt % of a non-volatile hydrogenated nitrile rubber polymer and from 50 to 97 wt % volatile compounds, in particular at least an organic solvent, whereby the aforementioned components add up to 90 to 100, preferably 95 to 100 wt % of the total mass of fluid F and in a preferred embodiment from 3 to 50 wt % of a non-volatile hydrogenated nitrile rubber polymer from 50 to 95 wt % volatile organic compounds, in particular at least an organic solvent, and from 0.5 to 20 wt % water, whereby the aforementioned components add up to 95 to 100 wt % of the total mass of fluid F.

The invention is in particular advantageous in view of energy and fresh water consumption. The products obtained are free of volatile compounds.

THE REFERENCE NUMERALS USED HEREINBEFORE ARE SUMMARIZED BELOW

1 pump
2, 2A, 2B heater
3 pressure control device
4, 4A, 4B degassing vessel
4.1, 4.1A, 4.1B vapor line
4.2, 4.2A, 4.2B pump
6 reheating unit
7 pressure control device
12 feeding point
13 rear vent port (upstream)
13.1 vapor line
15, 15A, 15B, 15B, 15C vent port (downstream)
15.1, 15.1A, 15.1B, 15.1C vapor line
16, 16A, 16B, 16B, 16C conveying section (downstream)
18, 18A, 18B, 18B, 18C accumulating section
20 last accumulating section
22 outlet section
F fluid F
G heated fluid H
H concentrated fluid H
J pre-concentrated fluid J
K reheated pre-concentrated fluid K
L reheated concentrated fluid L
hydrogenated nitrile rubber polymer obtained by the process according to the invention.

The invention claimed is:

1. A process for producing hydrogenated nitrile rubber containing less than 1.25 wt % volatile compounds, the process comprising removing volatile compounds from a fluid (F) having a viscosity of at maximum 200,000 Pa*s (measured at 100° C. and at a shear rate of 1/s) and containing:
   (i) at least one hydrogenated nitrile rubber comprising repeating units derived from at least one conjugated diene, at least one α,β-unsaturated nitrile, and optionally one or more copolymerizable monomer, and
   (ii) at least one volatile compound,
   and the process comprises the steps of:
   a) treating the fluid (F) in at least one concentrator unit comprising at least a heater (2), a degassing vessel (4) and a vapor line, whereby the fluid (F) is heated to produce a heated fluid (G), and the heated fluid (G) is fed into, and degassed in a degassing vessel where part of the volatile compounds are removed via the vapor line to obtain a concentrated fluid (H),
   b) reheating the concentrated fluid (H) from step a) in at least one reheating unit to obtain a reheated concentrated fluid (L) having a viscosity in the range of 10,000 mPa*s to 300,000 mPa*s;
   c) feeding the reheated concentrated fluid (L) from step b) into at least one extruder unit comprising at least an extruder degassing section comprising at least a conveying section, a vent port with one or more vapor lines, at least one accumulating section, and an outlet section;
d) introducing at least one stripping agent into the reheated concentrated fluid (L) the extruder unit; and
e) removing an additional portion of the volatile compounds from the reheated concentrated fluid (L) through the vent ports and vapor lines as the reheated concentrated fluid (L) passes through the extruder unit to produce, at the outlet section, hydrogenated nitrile rubber containing less than 1.25 wt % volatile compounds based on the mass of the hydrogenated nitrile rubber.

2. The process pursuant to claim 1, further comprising producing the fluid (F) by:
1) polymerising at least one conjugated diene, at least one α,β-unsaturated nitrile, and optionally one or more further copolymerizable monomers to obtain a nitrile rubber,
2) subjecting the nitrile rubber of step 1) to a catalytic metathesis reaction, optionally in the presence of a 1-olefin to reduce the molecular weight of the nitrile rubber, and
3) subjecting the nitrile rubber of step 2) to a hydrogenation reaction in a volatile compound resulting in the fluid (F).

3. The process pursuant to claim 1, wherein the hydrogenated nitrile rubber has a weight average molecular weight $M_w$ of 50,000 g/mol or less, and a polydispersity ($M_w/M_n$) of less than 2.0.

4. The process pursuant to claim 1, wherein the hydrogenated nitrile rubber has a weight average molecular weight $M_w$ of more than 50,000 g/mol, and the polydispersity is 2.1 to 3.0.

5. The process pursuant to claim 1, wherein the fluid (F) contains from 3 to 50 wt % of the non-volatile hydrogenated nitrile rubber polymer and from 50 to 97 wt % volatile compounds, whereby the aforementioned components add up to 90 to 100% of the total mass of fluid (F).

6. The process pursuant to claim 1, wherein the fluid (F) entering the heater (2) has a temperature of 10° C. to 100° C.

7. The process pursuant to claim 1, wherein the fluid (F) entering the heater (2) has a viscosity of 100 mPa*s to 75,000 mPa*s.

8. The process pursuant to claim 1, wherein the heated fluid (G) has a temperature of 100 to 250° C.

9. The process pursuant to claim 1, wherein the pressure in the degassing vessel (4) is 100 hPa to 4,000 hPa.

10. The process pursuant to claim 1, wherein the degassing vessel (4) has the shape of a cyclone and has at least a torispherical shaped bottom to facilitate removal of concentrated fluid (H).

11. The process pursuant to claim 1, wherein after degassing and separation in step a), the concentrated fluid (H) is obtained, and the method further comprises removing the concentrated fluid (H) from the degassing vessel (4) by means of a pump (4.2) which is selected from the group consisting of positive displacement type pumps, gear pumps, piston pumps, membrane pumps, screw type pumps, extruder type pumps like counter-rotating or co-rotating single or twin screw extruders or kneader type pumps or combinations thereof.

12. The process pursuant to claim 1, wherein the temperature of the concentrated fluid (H) is lower than that of heated fluid (G) and the temperature of concentrated fluid (H) is 15° C. to 150° C.

13. The process pursuant to claim 1, wherein the temperature of the reheated concentrated fluid (L) is higher than that of the concentrated fluid (H) and the temperature of concentrated fluid (L) is 50° C. to 250° C.

14. The process pursuant to claim 1, wherein the extruder unit comprises at least one extruder selected from the group consisting of single and multiscrew extruders.

15. The process pursuant to claim 1, wherein the extruder unit comprises means to operate separate zones of the extruder independently of each other at different temperatures so that the zones can either be heated, unheated or cooled.

16. The process pursuant to claim 1, wherein the vent ports (15) comprise means to prevent the reheated concentrated fluid (L) or the hydrogenated nitrile rubber, from coming out of the vent ports.

17. The process pursuant to claim 1, wherein accumulation in the accumulating sections (18, 20) is accomplished by kneading or throttling elements, blister discs or die plates.

18. The process pursuant to claim 1, wherein the extruder unit comprises 1 to 30 conveying and accumulating sections.

19. The process pursuant to claim 1, wherein the outlet section (22) comprises means to allow the hydrogenated nitrile rubber to exit the extruder and product processing equipment, whereby the processing equipment is selected from the group consisting of combinations of die plates and cutters; die plates and underwater-pelletizing means; means for crumb formation, turbulators and fixed knifes placed at the end plate of the extruder.

20. The process pursuant to claim 1, wherein the outlet section (22) further comprises cooling means, whereby the cooling means are selected from the group consisting of pneumatic crumb conveyers with convective air cooling, vibrating crumb conveyers with convective air cooling, vibrating crumb conveyer with cooled contact surfaces, belt conveyers with convective air cooling, belt conveyer with cooled belts, water spraying on hot crumbs upon outlet of the extruder and underwater-pelletizing means.

21. The process pursuant to claim 1, wherein the outlet section (22) further comprises cooling means selected from the group consisting of heat exchangers, tube bundle heat exchangers, belt conveyors with convective air cooling, belt conveyors with cooled belts, water spraying on hot hydrogenated nitrile rubber or a water bath, whereby water serves as the coolant.

22. The process pursuant to claim 1, wherein the stripping agent is selected from the group consisting of nitrogen, carbon dioxide, carbon monoxide, noble gases, methane, ethane, propane, butane, isobutane, pentane, hexane, cyclohexane, ethylene, propene, isobutane, butadiene, natural gas, acetone, methylethylketone, methanol, ethanol, diethylether, tetrahydrofuran, water or a mixture of the aforementioned substances.

23. The process pursuant to claim 1, further comprising adding additives to fluid (F) or in the extruder unit by means of a side feeder or, as far as they are liquid, together with the stripping agent.

24. The process pursuant to claim 1, wherein step a) is repeated a least once, wherein the repetition is accomplished by connecting the respective number of concentrating units in series.

25. The process pursuant to claim 1, wherein the concentration unit, the reheating unit, and/or the extruder unit comprise one or more pressure regulation devices.

26. The process pursuant to claim 1, wherein the extruder unit comprises an entry point for feeding the reheated concentrated fluid (L) from step b) into the at least one extruder unit, and the extruder unit further comprises at least one additional extruder degassing section in an upstream direction of the entry point.

27. The process pursuant to claim 1, wherein the process is performed using a device comprising at least:
- one concentrating unit comprising a heater (2) in communication with a degassing vessel (4), whereby the bottom part of the degassing vessel (4) is in communication with a pump (4.2) the upper part of the degassing vessel (4) is in communication with at least one vapour line (4.1),
- one heating unit (6) in communication with the pump (4.2) of the concentrating unit and a feeding point (12) on an extruder unit, and
- one extruder unit comprising at least one feeding point (12), one extruder degassing section (16), one accumulating section (20) and one outlet section (22), whereby the extruder degassing section (16) further comprises at least one vent port (15) connected to a vapour line (15.1).

* * * * *